(12) United States Patent
Hanamoto

(10) Patent No.: US 11,490,066 B2
(45) Date of Patent: Nov. 1, 2022

(54) IMAGE PROCESSING APPARATUS THAT OBTAINS MODEL DATA, CONTROL METHOD OF IMAGE PROCESSING APPARATUS, AND STORAGE MEDIUM

(71) Applicant: CANON KABUSHIKI KAISHA, Tokyo (JP)

(72) Inventor: Takashi Hanamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 16/872,675

(22) Filed: May 12, 2020

(65) Prior Publication Data

US 2020/0366878 A1 Nov. 19, 2020

(30) Foreign Application Priority Data

May 17, 2019 (JP) .............................. JP2019-093788

(51) Int. Cl.
*G06T 15/00* (2011.01)
*H04N 13/161* (2018.01)
*G06T 9/00* (2006.01)
*H04N 13/111* (2018.01)

(52) U.S. Cl.
CPC ............. *H04N 13/161* (2018.05); *G06T 9/00* (2013.01); *H04N 13/111* (2018.05)

(58) Field of Classification Search
None
See application file for complete search history.

(56) References Cited

U.S. PATENT DOCUMENTS

| 10,271,040 | B1* | 4/2019 | Marchak, Jr. | H04N 19/90 |
| 2009/0225076 | A1* | 9/2009 | Vlietinck | G06T 15/005 345/419 |
| 2011/0227938 | A1* | 9/2011 | Lan | G06T 15/005 345/581 |
| 2013/0342550 | A1* | 12/2013 | Yang | H04N 19/172 345/545 |
| 2016/0192009 | A1* | 6/2016 | Sugio | H04N 21/252 725/32 |
| 2018/0126272 | A1 | 5/2018 | Hiruta | |
| 2019/0335166 | A1* | 10/2019 | Copley | G06T 15/08 |
| 2020/0106968 | A1* | 4/2020 | Shuden | H04N 5/2628 |
| 2021/0044793 | A1* | 2/2021 | Yoshikawa | H04N 21/2668 |

FOREIGN PATENT DOCUMENTS

JP 2018077555 A 5/2018

* cited by examiner

*Primary Examiner* — Anh-Tuan V Nguyen
(74) *Attorney, Agent, or Firm* — Rossi, Kimms & McDowell LLP

(57) ABSTRACT

A technique of the present disclosure includes: an obtaining unit configured to obtain model data indicating a three-dimensional shape of an object in a space; a receiving unit configured to receive viewpoint information from an external apparatus, the viewpoint information indicating a virtual viewpoint for a virtual viewpoint image to be generated by the external apparatus based on data transmitted from the image processing apparatus, the virtual viewpoint image depicting the space as viewed from the virtual viewpoint; a generating unit configured to generate image data by rendering a first portion of the obtained model data, based on the received viewpoint information; and a transmitting unit configured to transmit the generated image data and a second portion of the obtained model data different from the first portion to the external apparatus.

17 Claims, 12 Drawing Sheets

IMAGE CAPTURING RESULT

OBJECT EXTRACTION RESULT

POINT CLOUD GENERATION RESULT

MODEL GENERATION RESULT

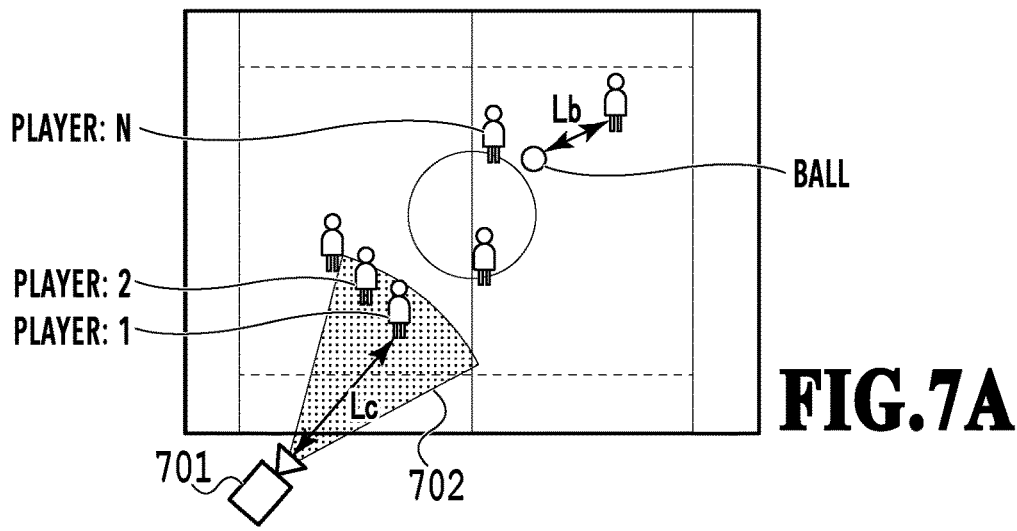
FIG.7A
| OBJECT ID | DISTANCE TO VIRTUAL CAMERA: Lc | DISTANCE TO BALL: Lb |
|---|---|---|
| PLAYER: 1 | 18m | 35m |
| PLAYER: 2 | 20m | 36m |
| ... | ... | ... |
| PLAYER: N | 42m | 2m |
| BALL | 38m | 0m |
FIG.7B
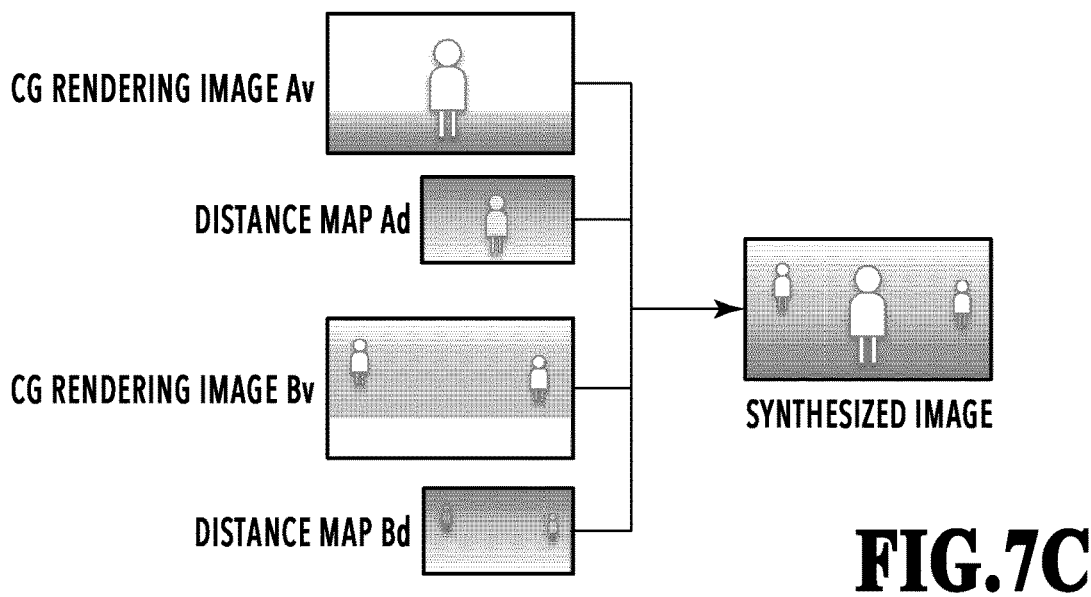
FIG.7C

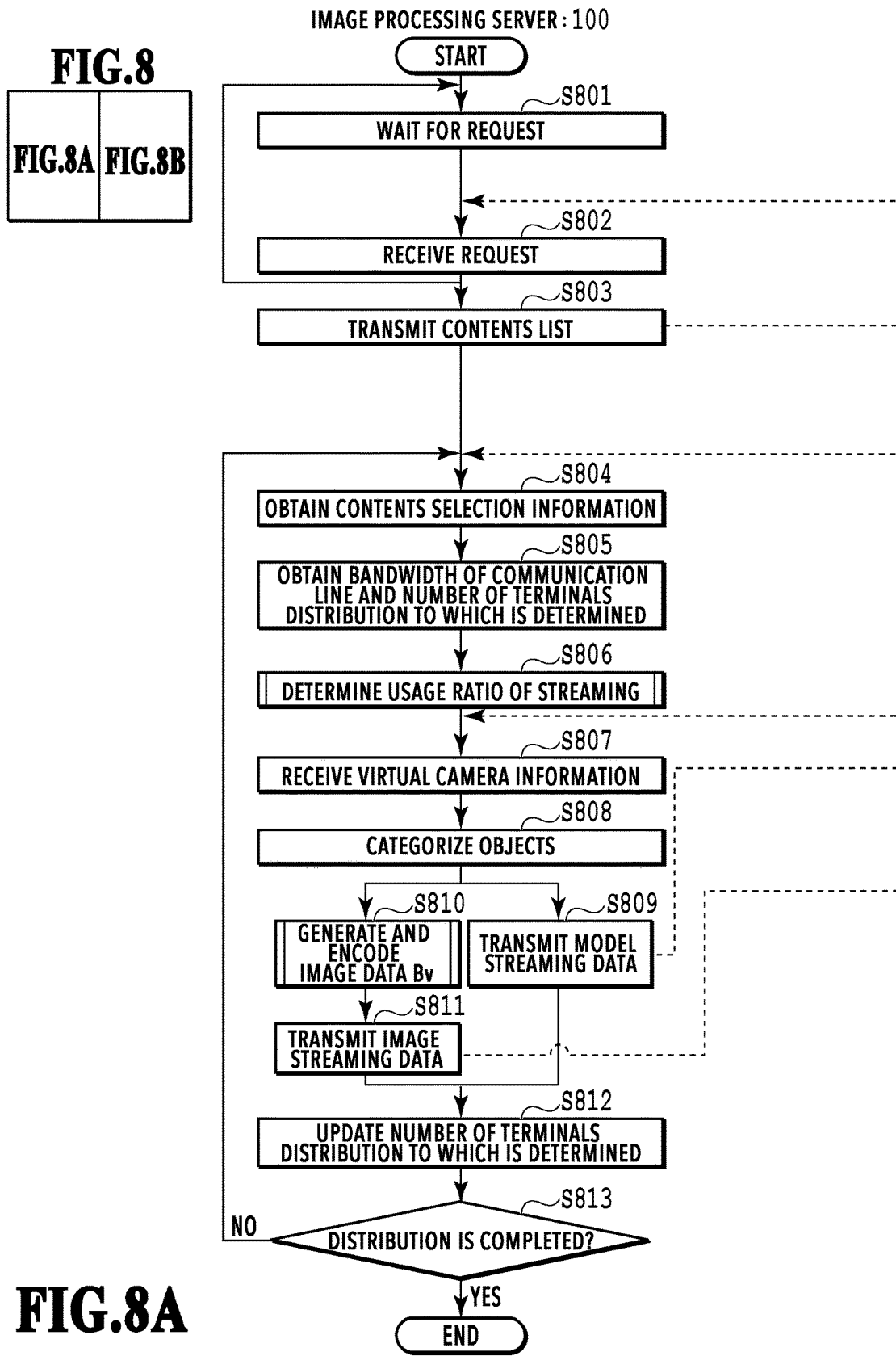

IMAGE PROCESSING APPARATUS THAT OBTAINS MODEL DATA, CONTROL METHOD OF IMAGE PROCESSING APPARATUS, AND STORAGE MEDIUM

BACKGROUND OF THE INVENTION

Field of the Invention

A technique of the present disclosure relates to a technique of distributing image data using three-dimensional computer graphics.

Description of the Related Art

As a technique of reproducing image data depicting an appearance from a virtual viewpoint (virtual camera) set in a three-dimensional space by using actual camera image data obtained by capturing images with multiple cameras, there is a virtual viewpoint image technique. Virtual viewpoint image data is generated as follows. First, an image processing server estimates a three-dimensional shape of an object (captured object) from the actual camera image data and generates model data (three-dimensional shape data and texture data) of the object. Then, a virtual camera is set for the generated model data and CG rendering is performed for the model data. Image data depicting an appearance from the virtual camera located at any position and pointing in any direction can be thereby generated.

Delay with respect to a user operation of controlling the virtual camera can be reduced by distributing the model data of the object from the image processing server to a user terminal that is used to set the position and direction of the virtual camera and executing the CG rendering in the terminal. This enables generation of interactive virtual viewpoint image data.

However, the data amount of the model data is large. For example, assume a case where the model data is to be distributed by using wireless communication to many user terminals present in the same cell. In this case, the distributed data occupies the bandwidth of the communication line and causes a decrease in communication speed of each user terminal. As a result, delay relating to the transmission of the model data increases and time of a user waiting for start of reproduction of the virtual viewpoint image becomes longer.

Meanwhile, communication data amount can be reduced by employing a distribution mode in which the image processing server obtains control information of the virtual camera from each user terminal to perform rendering and transmits compressed image data to the user terminal. However, this distribution mode has problems such as image quality degradation due to compression noise, an increase in latency (delay) of image distribution caused by delay in communication of the control information of the virtual camera, an increase in processing load of the image processing server, and the like.

Japanese Patent Laid-Open No. 2018-77555 discloses a technique in which, in a game system, some of multiple objects included in the contents are rendered in a server apparatus and the other objects are rendered in a terminal apparatus to distribute rendering processing load. However, in the technique of Japanese Patent Laid-Open No. 2018-77555, model data of objects for rendering needs to be stored in the terminal apparatus in advance.

In a system in which data is distributed for reproduction of a virtual viewpoint image, there is a demand for efficient data distribution to achieve, for example, reproduction of an image in image quality depending on a performance of a user terminal, suppression of distribution delay depending on a communication environment, and the like.

SUMMARY OF THE INVENTION

A technique of the present disclosure includes: an obtaining unit that obtains model data indicating a three-dimensional shape of an object in a space; a receiving unit configured to receive viewpoint information from an external apparatus, the viewpoint information indicating a virtual viewpoint for a virtual viewpoint image to be generated by the external apparatus based on data transmitted from the image processing apparatus, the virtual viewpoint image depicting the space as viewed from the virtual viewpoint; a generating unit configured to generate image data by rendering a first portion of the obtained model data, based on the received viewpoint information; and a transmitting unit configured to transmit the generated image data and a second portion of the obtained model data different from the first portion to the external apparatus.

Further features of the present invention will become apparent from the following description of exemplary embodiments with reference to the attached drawings.

BRIEF DESCRIPTION OF THE DRAWINGS

FIG. 7A is a view illustrating an outline of object categorization;

FIG. 7B is a table illustrating the outline of the object categorization;

FIG. 7C is a view illustrating the outline of the object categorization;

FIG. 8 is a diagram representing a relationship between FIGS. 8A and 8B;

FIGS. 8A and 8B are flowcharts illustrating model data distribution processing;

DESCRIPTION OF THE EMBODIMENTS

Figure 1:
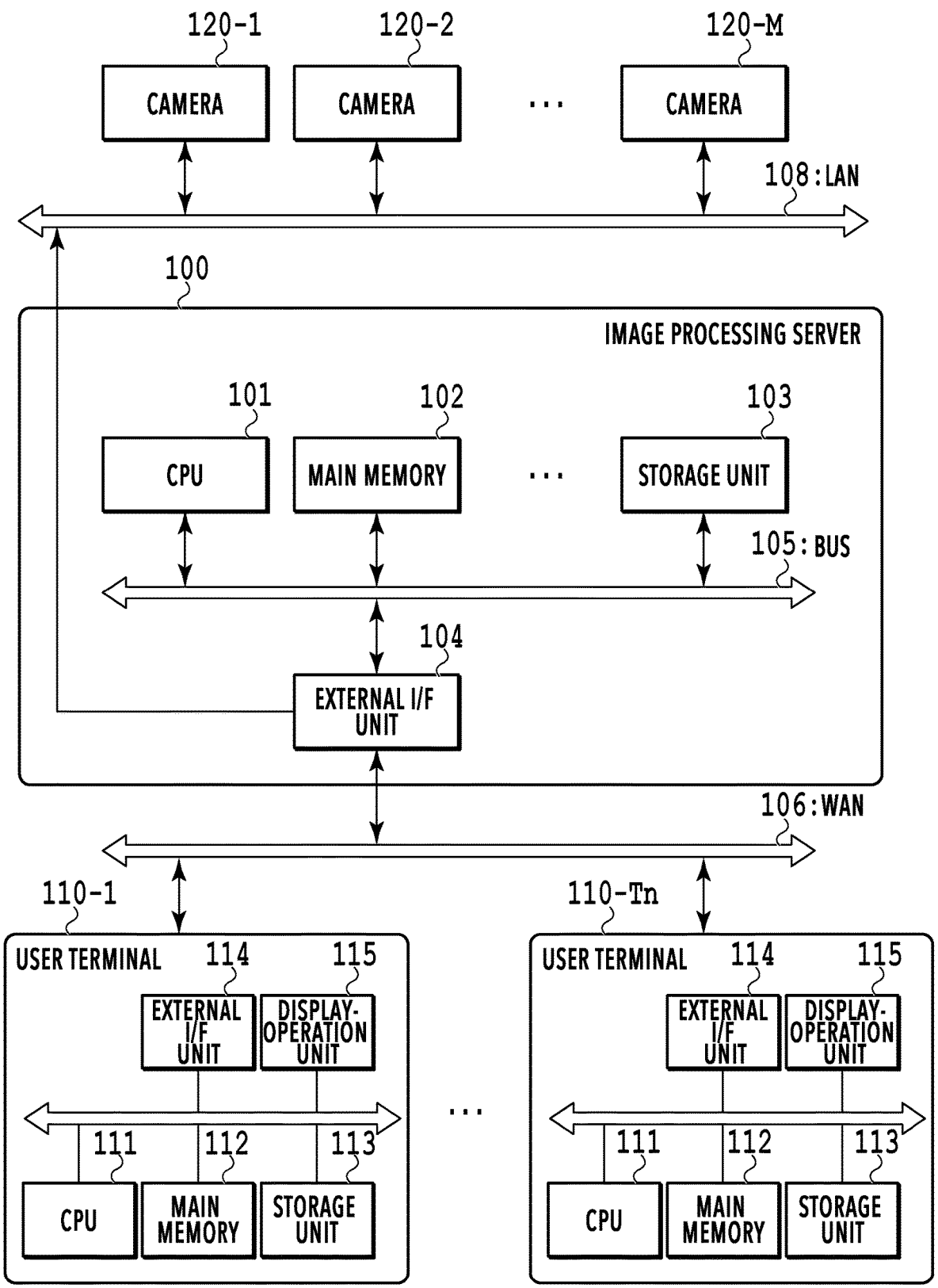
FIG. 1 is a block diagram illustrating configurations of an image processing server, cameras, and user terminals.

Embodiments of the present invention are described below with reference to the drawings. Note that the following embodiments do not limit the present invention and not all combinations of features described in the embodiments are necessary for solving the present invention. Note that the same configurations are described by being denoted by the same reference numerals.

Embodiment 1

In this embodiment, description is given of a method in which interactive virtual viewpoint image data is distributed from an image processing server to user terminals via the Internet line (hereafter, referred to as WAN line). In this description, the case where there are one image processing server that is a distribution source and multiple user terminals that are distribution targets is used as an example to simplify the description. Moreover, it is assumed that the image processing server is installed in a data center or the like and users operate the user terminals (smartphones, PCs, tablets, and the like) at locations such as users' houses and outside users' houses to receive and view the virtual viewpoint image data. Note that the configuration may be such that there are multiple image processing servers and each user terminal connects to one of the image processing servers to perform data communication therewith. The connection between the image processing server and each user terminal is not limited to the WAN line and may be a LAN line and may be wired connection or wireless connection.

FIG. 1 is a block diagram illustrating system configurations of the image processing server, an image capturing system (cameras), and the user terminals in the embodiment of the present invention.

The image processing server 100 includes a CPU 101, a main memory 102, a storage unit 103, an external I/F unit 104, and a bus 105. The CPU 101 executes calculation processing and various programs. The main memory 102 provides programs, data, and workspaces necessary for processing to the CPU 101. The storage unit 103 is a device that stores various kinds of data necessary for an image processing and, for example, a non-volatile memory such as a hard disk drive or a silicon disk is used as the storage unit 103. The external I/F unit 104 is connected to external apparatuses such as the cameras 120 and the user terminals 110 and exchanges image data, control signal data, model data, and the like with the connected external apparatuses, via transmission channels such as a WAN 106 and a LAN 108. The bus 105 connects the aforementioned units to one another to perform data transfer.

There are multiple cameras 120 and image data captured by the cameras 120 is transferred to the image processing server 100 via the LAN 108. The LAN 108 is a local area network and is formed of Ethernet (registered trademark) cables and L2 and L3 switches.

Each user terminal 110 includes a CPU 111, a main memory 112, a storage unit 113, and an external I/F unit 114 like the image processing server 100. The user terminal 110 also includes a display-operation unit 115 which is a touch panel for receiving operations from the user and for displaying a virtual viewpoint image. The user terminal 110 and the image processing server 100 are connected to the WAN 106 via various routers and can transmit the image data, the control signal data, the model data, and the like to each other. The WAN 106 is a wide area network. In the embodiment, the image processing server 100 is connected to the WAN 106 via a transmission channel based on a wired communication standard used for data communication such as an optical fiber and the user terminal 110 is connected to the WAN 106 via a transmission channel based on a wireless communication standard called Wi-Fi, 4G, or 5G.

Note that the system configuration includes various components other than those described above. However, since such components are not the main points of the present invention, description thereof is omitted.

Figure 3:
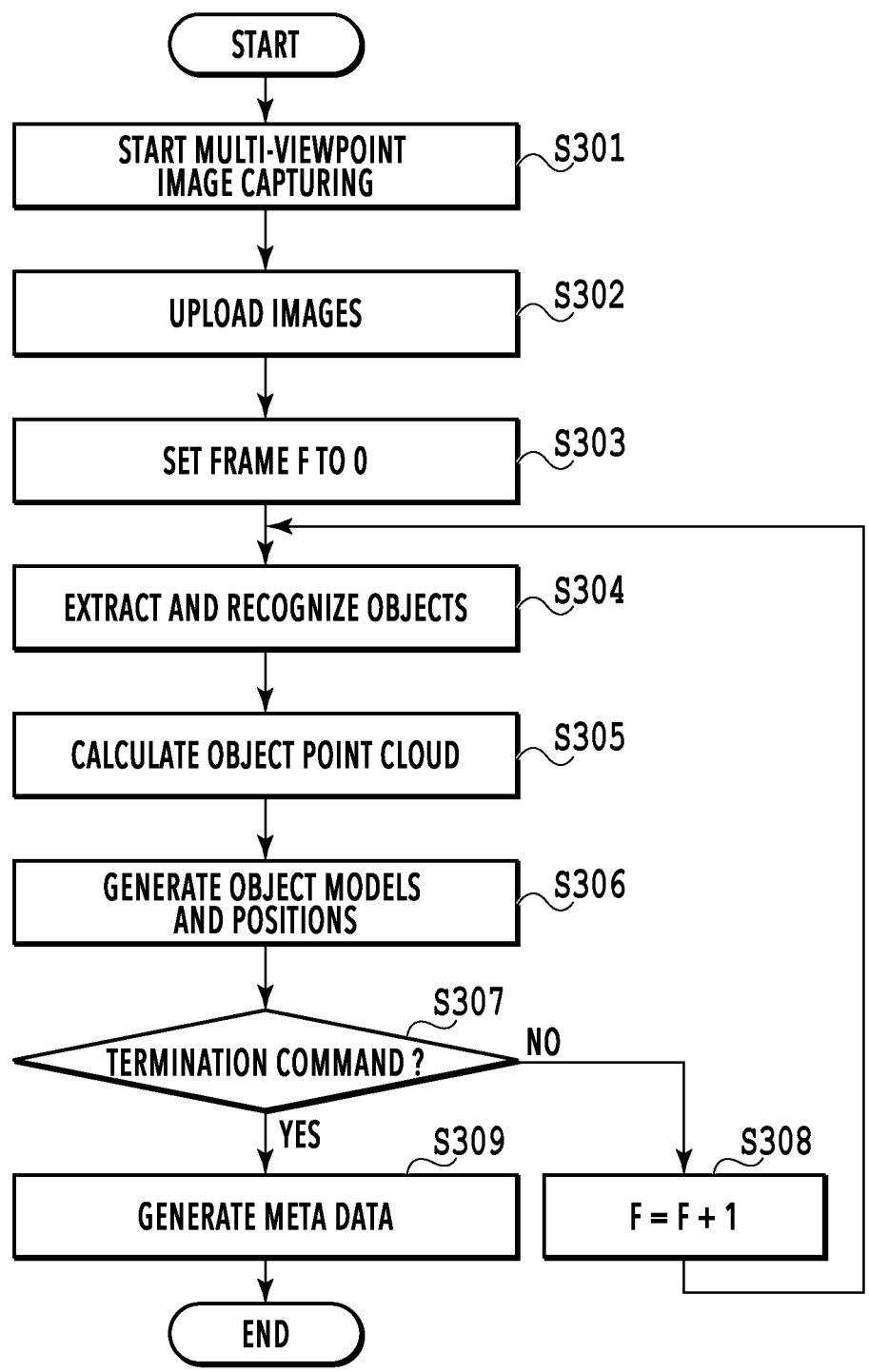
FIG. 3 is a flowchart illustrating model data generation processing.

FIG. 3 is a flowchart illustrating processing steps of generating model data that is formed of elements provided in object units and that is the base of the virtual viewpoint image data. The model data may be generated in the image processing server 100 or in another apparatus.

Figure 2A:
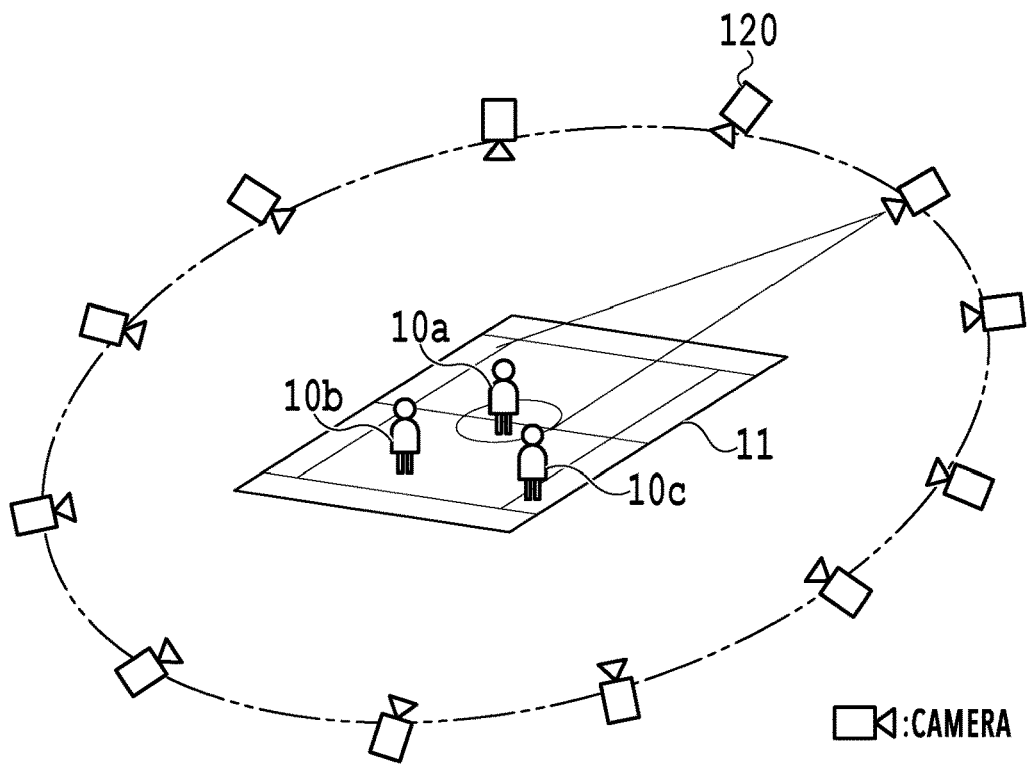
FIG. 2A is a schematic view illustrating an arrangement of cameras.
Figure 2B:
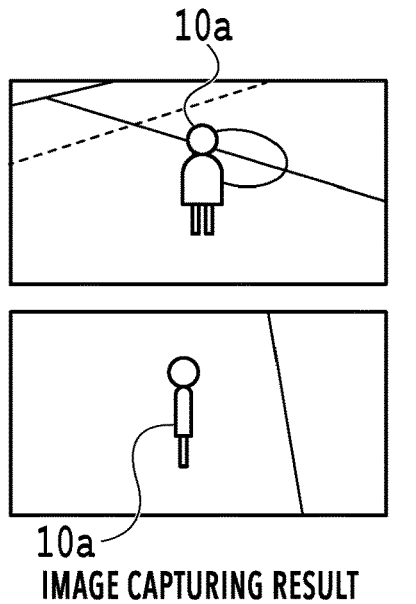
FIG. 2B is a schematic view illustrating image capturing results.

In S301, images of the objects are captured from multi-viewpoints, specifically, from different multiple viewpoints by using multiple cameras 120 to generate multiple pieces of image data. FIG. 2A illustrates an outline of image capturing. Multiple objects 10 are present on a field 11 for soccer, rugby, or the like and a game is played. Several tens of cameras 120 are arranged around the field 11 to capture images of the objects 10 from all directions (FIG. 2B).

In S302, the image data obtained in the image capturing by the multiple cameras 120 is transmitted to the image processing server 100 via the LAN.

In S303, the image processing server 100 initializes the model data generation processing. Specifically, the image processing server 100 creates a variable F indicating a frame number of frame image data in the virtual viewpoint image data to be generated and initializes the variable F to 0.

Figure 2C:
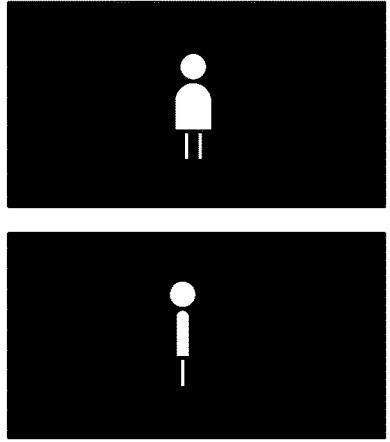
FIG. 2C is a view illustrating results of object extraction and recognition processing.

In S304, object extraction and recognition processing are performed (FIG. 2C). Image data in which only objects are extracted is generated based on difference values between image data including only the field 11 and including no objects 10 and image data including the objects 10. Imaged data obtained by capturing the field 11 in the case where there are no objects 10 on the field 11 can be used as the image data including only the field 11. Alternatively, the image data including only the field 11 can be generated by extracting multiple frames from the image data including the objects 10 and applying an intermediate value filter to these frames. The recognition processing is processing of identifying the types of the objects 10 and, in this example, a ball and humans are identified. The recognition processing may be performed by using machining learning or may be a method of determining a circular object in object extraction results as the ball.

Figure 2D:
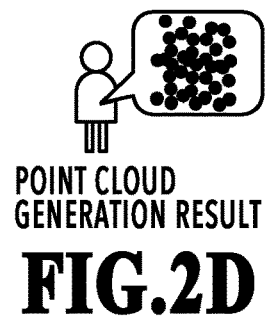
FIG. 2D is a view illustrating results of calculating a three-dimensional shape as a point cloud or voxels.

In S305, the three-dimensional shape of each object 10 is calculated as a point cloud or voxels (FIG. 2D). This calculation is performed based on multiple object extraction results by using a method such as Shape From Silhouette (SFS) or Visual Hull (VH).

Figure 2E:
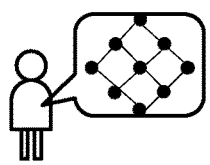
FIG. 2E is a view illustrating a result of converting the three-dimensional shape into a mesh formed of triangular planes.

In S306, the three-dimensional shape calculated as a point cloud or a voxel is converted to a mesh formed of triangular planes (FIG. 2E). The mesh conversion is performed by using Ball Pivoting, VCG, or the like. Parameters in the mesh conversion are adjusted such that the number of triangles forming the mesh is constant to make the data amounts of the respective objects even.

Moreover, in this case, textures to be attached (mapped) to the mesh are generated at the same time. The textures are generated by cutting out images from the captured multi-viewpoint image data. In this case, generally, an approximate plane of the mesh is calculated for each of texture generation units and the image data captured by the camera in a direction close to the normal direction of the approximate plane is used. In this case, the position of each object 10 is calculated from the position of center of gravity. As described above, the model data is formed of elements that are provided in object units and that are each formed of the three-dimensional shape data and the texture data. Although the three-dimensional shape data is assumed to be the mesh data in the embodiment, the three-dimensional shape data is not limited to this and may be point cloud data or voxel data.

In S307, a system manager determines whether to terminate the processing (whether a match has ended).

In the case where the determination result is No in S307, the processing proceeds to S308 and the processing continues with the next frame set as the processing target.

In the case where the determination result is YES in S307, the processing proceeds to step S309. In S309, the object recognition results and the object positions are generated as metadata to be associated with the frame number and the series of processes is completed. Moreover, in this case, metadata (play analysis, time, and the like) manually or automatically generated in an external device is taken in via the WAN 106.

Figures 5A, 5B, 5C:
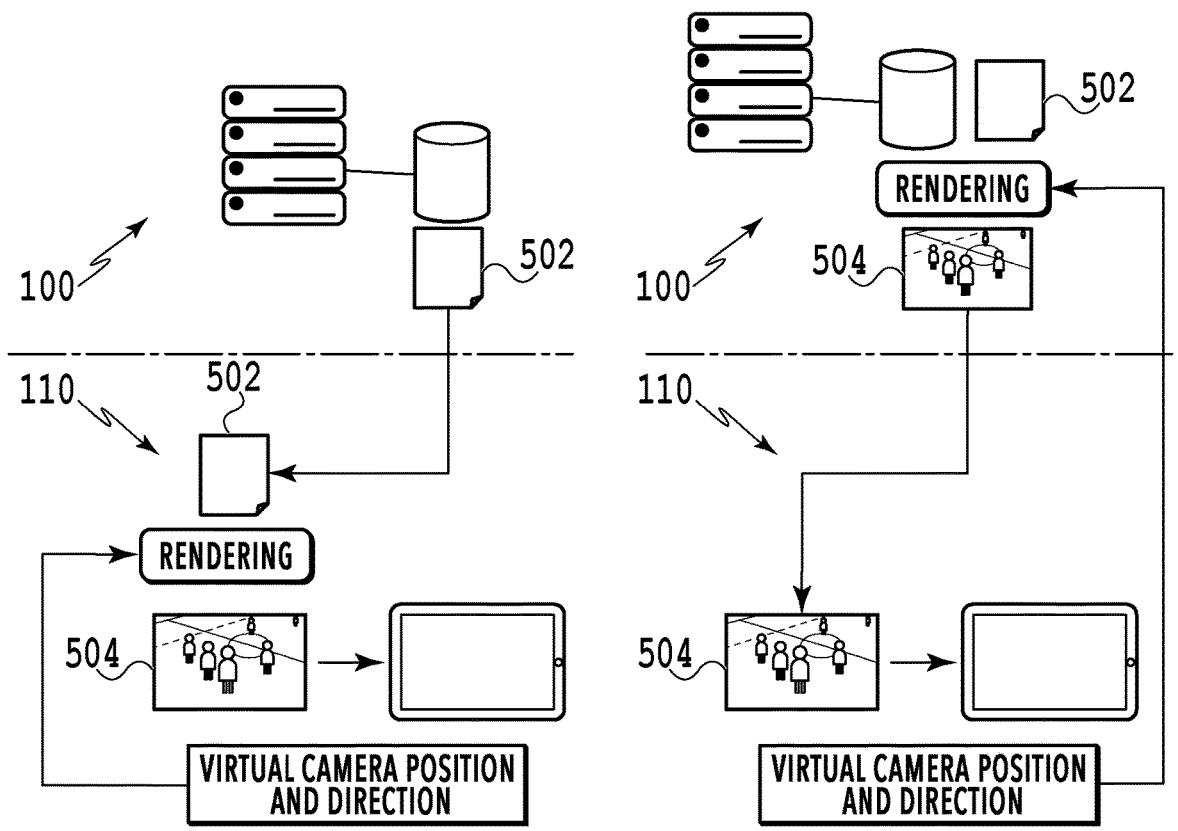
FIG. 5A is a table illustrating an outline of model data.
FIG. 5B is a view illustrating streaming of virtual viewpoint image data.
FIG. 5C is a view illustrating streaming of the virtual viewpoint image data.

FIG. 5A illustrates the model data necessary for the generation of the virtual viewpoint image data. Object mesh data and object texture data are generated for all frames in the actual camera image data according to the flowchart of FIG. 3. In this case, a combination of the object mesh data and the object texture data is defined as object model data.

Background mesh data is mesh data of a stadium, a field, soccer goals, stands, and the like which are background regions. Since the shapes of these objects do not change, the background mesh data is generated by using a 3D laser scanner or the like for each match or each stadium and does not have to be generated for each frame. However, the background mesh data may be regularly updated. A background texture is a texture data attached to the background mesh and is generated for each frame by cutting images from the actual camera image data. This is performed to reproduce shadows and the like depending on changes in daylight and the like. In this description, a combination of the background mesh data and the background texture data is defined as background model data.

Figure 4:
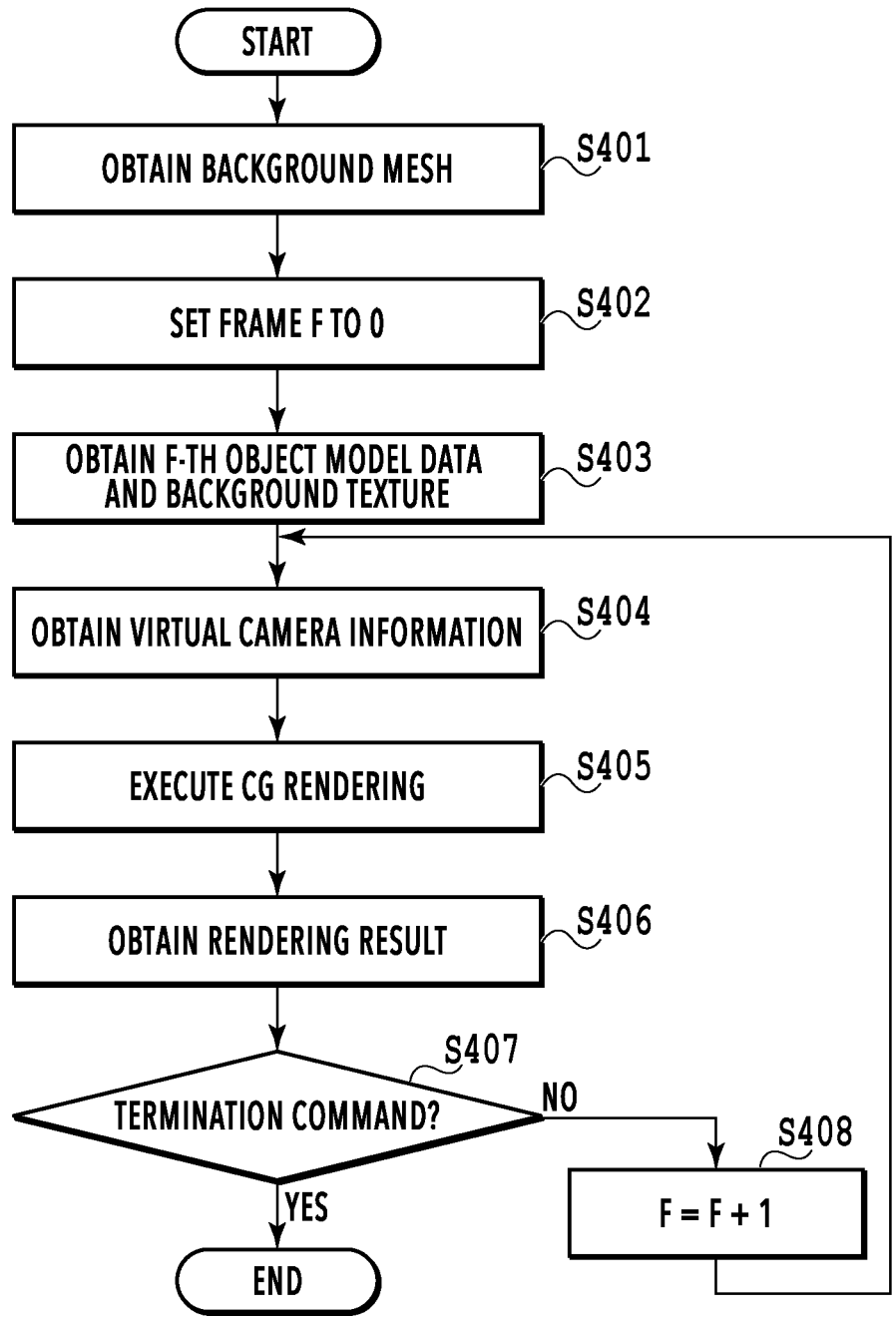
FIG. 4 is a flowchart illustrating CG rendering processing.

FIG. 4 is a flowchart illustrating processing steps of generating the virtual viewpoint image data by using the model data (hereafter, referred to as rendering). This processing is executed by the image processing server 100 or the user terminals 110.

In S401, the background mesh data is loaded onto the memory.

In S402, the variable F holding the frame number of the virtual viewpoint image data to be generated is generated and initialized to 0.

In S403, the object model data of the F-th frame generated in FIG. 3 and the background texture data are loaded onto the memory.

In S404, virtual camera information (virtual viewpoint information) is read. The virtual camera information includes a position, a direction, and an angle of view (focal length) of the virtual camera. Although these parameters are determined by operations made by the user on the terminal, for example, predetermined values may be used for some pieces of information such as the angle of view.

In S405, image data as viewed from the virtual camera is generated from the object model data and the background model data, based on the virtual camera information, by using a general CG rendering method. In this case, distance information that is generated as a by-product in the CG rendering and that relates to a distance from the virtual camera to each of the objects and background is outputted as a distance map. Note that the distance map can be also generated from the virtual camera information, the object mesh data, and the background mesh data without performing the CG rendering.

In S406, the generated rendering result (virtual viewpoint image data) and the distance map are stored while being associated with each other.

In S407, whether to terminate the processing of generating the virtual viewpoint image data is determined.

In the case where the determination result is No in S407, the processing proceeds to S408 and the rendering processing for the next frame is continuously executed.

In the case where the determination result is Yes in S407, the rendering processing is terminated.

FIGS. 5B and 5C are diagrams illustrating an outline of streaming of the virtual viewpoint image data. Note that streaming means dividing data into small pieces and sequentially distributing the divided small pieces of data. A method of streaming the model data is hereafter referred to as model streaming and a method of streaming the image data is hereafter referred to as image streaming.

FIG. 5B is a diagram explaining the model streaming. In FIG. 5B, model data 502 stored in the image processing server 100 is transmitted to the user terminal 110 as need via a communication line and the rendering processing is executed in the user terminal 110. Advantages of the model streaming include occurrence of no degradation in image quality and a low latency to a user operation. Meanwhile, the model streaming has the following problem. Since the model streaming uses a large data amount of 100 Mbps to 500 Mbps and occupies the bandwidth of the WAN 106 being the communication line to which the image processing server is connected, the number of users to which the data can be simultaneously distributed is limited.

FIG. 5C is a diagram explaining the image streaming. In FIG. 5C, the image processing server 100 performs the rendering based on the model data 502 to generate image data 504. The generated image data 504 is transmitted to the user terminal 110 as needed via the communication line and is reproduced in the user terminal 110. The image streaming has the following advantage. Since the image streaming uses a small data amount of about 5 Mbps and is less likely to occupy the communication line than the model streaming, the data can be distributed to more users. Meanwhile, the image streaming has the following problems. Since the image data is encoded (compressed) and transmitted, the image degradation occurs and the latency to the user operation occurs.

Figure 8B:
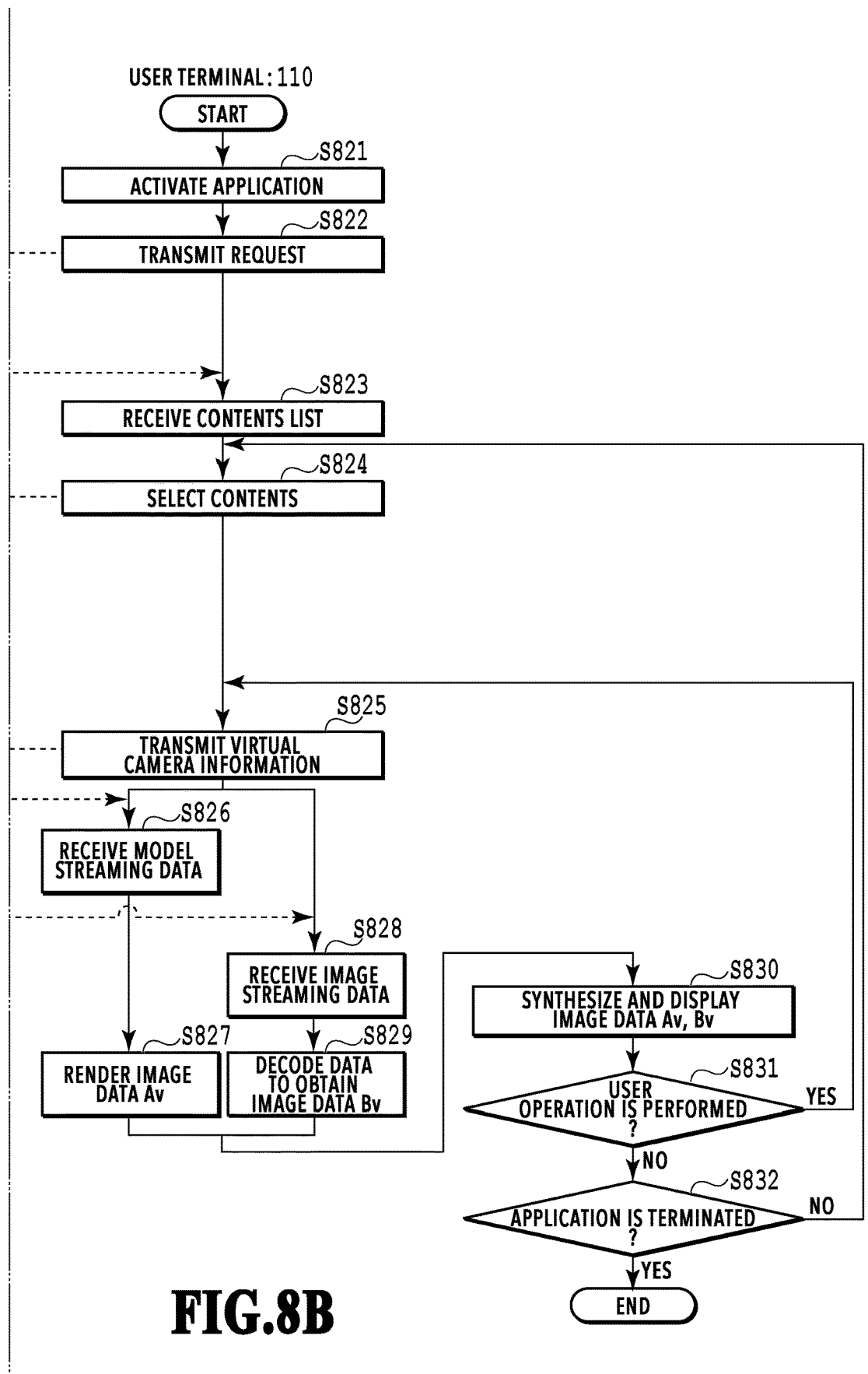

FIG. 8 is a flowchart explaining processing steps of an image processing system that distributes the virtual viewpoint image data to many users while suppressing the image quality degradation by using the model streaming and the image streaming. S801 to S813 on FIG. 8A are processing performed by the image processing server 100 and S821 to S832 on FIG. 8B are processing performed by each user terminal 110. Assume that the model data is already generated in the image processing server 100 and communication between the image processing server 100 and the user terminal 110 is performed via the WAN 106. Moreover, assume that there are Tn user terminals 110 that are already connected to the image processing server 100 and that have already selected the contents.

In S801, the image processing server 100 transitions to a state waiting for a request from the user terminal 110.

In S821, the user terminal 110 activates a virtual viewpoint image viewing application based on a user operation.

In S822, the user terminal 110 requests the image processing server 100 for a contents list.

In S802, the image processing server 100 receives the request for the contents list.

In S803, the image processing server 100 transmits the contents list to the user terminal 110.

In S823, the user terminal 110 receives the requested contents list from the image processing server 100.

Figure 6A:
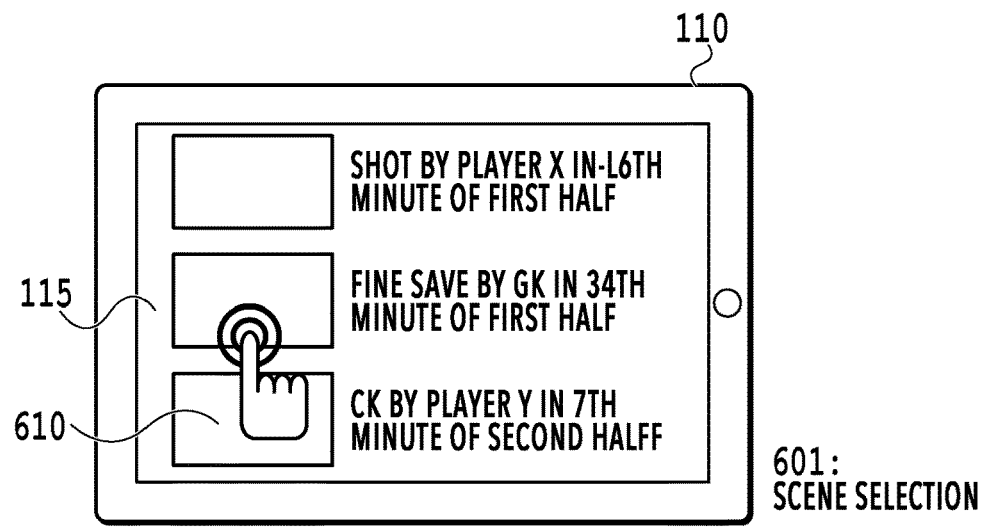
FIG. 6A is a view illustrating an outline of a user terminal.

In S824, after receiving the contents list, the user terminal 110 displays a scene selection 601 screen of FIG. 6A on the display-operation unit 115 and waits until the user makes selection. In this case, thumbnail images and metadata of image data on a match are displayed on the display-operation unit 115 of the user terminal 110. The user selects the contents corresponding to a desired scene from the thumbnail images and the metadata displayed on the display-operation unit 115. For example, the user can select the contents corresponding to a specific scene by touching one of the thumbnail images with the finger 610 or by performing a similar operation. Note that the displayed metadata is data relating to the object recognition results and the object positions generated in S309.

In S825, in the case where the user selects the contents, the user terminal 110 transmits contents selection information to the image processing server 100.

In S804, the image processing server 100 receives the contents selection information.

In S805, the image processing server 100 increments the number of user terminals from which the contents selection information is received and for which the distribution is determined by one as Tn=Tn+1 and updates a current usable bandwidth Bw of the WAN 106 and the number Tn of terminals distribution to which is determined.

In S806, the image processing server 100 determines a usage ratio (distribution) between the model streaming and the image streaming, based on the bandwidth Bw of the WAN 106 and the number Tn of user terminals. Specifically, the image processing server 100 calculates a maximum object model data number Mn which is the maximum number of objects whose model data can be transmitted to each user terminal per unit time. Formula (1) describes a calculation formula for the maximum object model data number Mn.

$$Mn=(Bw/Tn-Sv-Sb)/Sm \quad (1)$$

In this formula, Sv is a bandwidth necessary for the image streaming, Sb is a data amount of the background texture per unit time to be described later, Sm is a data amount of model data for one object per unit time. In the case where the maximum object model data number Mn is less than one, the image processing server 100 performs distribution entirely in the image streaming without performing the model streaming. Meanwhile, in the case where the maximum object model data number Mn is greater than the number of all objects, the image processing server 100 performs distribution entirely in the model streaming.

Figure 6B:
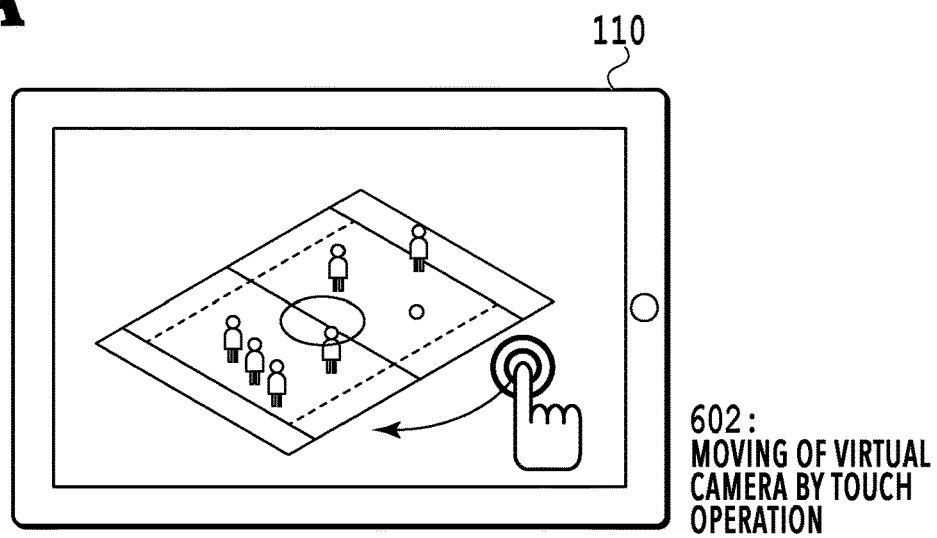
FIG. 6B is a view illustrating the outline of the user terminal.
Figure 6C:
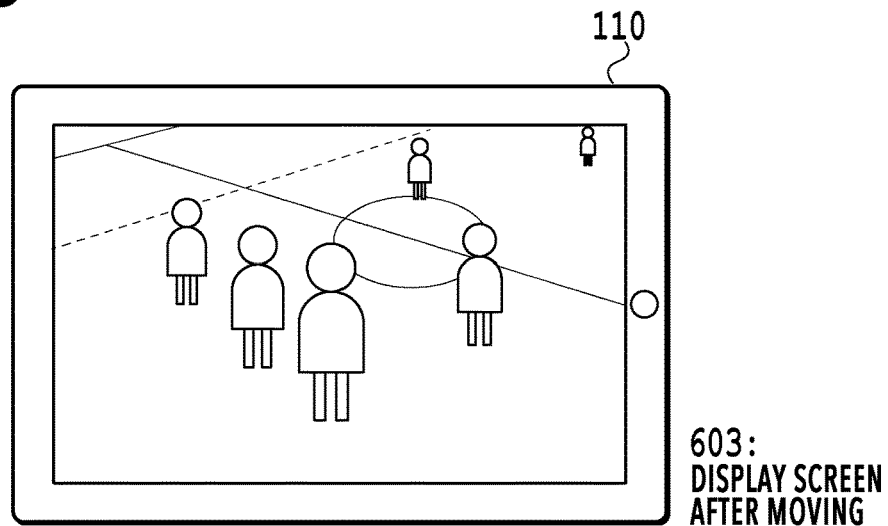
FIG. 6C is a view illustrating the outline of the user terminal.

In S825, the user terminal 110 transmits the virtual camera information to the image processing server 100. Although the virtual camera information is the same as that in S404, the user can change the values in the virtual camera information by performing an operation on the user terminal 110. For example, in the initial setting of the virtual camera information, the virtual camera position and direction are set such that a bird's-eye-view of a field is displayed as illustrated in FIG. 6B. However, the user can perform operation on the display-operation unit 115 to reset the virtual camera position and direction as illustrated in FIG. 6C. Accordingly, the user terminal 110 transmits the virtual camera information to the image processing server 100 every time the virtual camera information is reset in the user terminal 110.

In S807, the image processing server 100 receives the virtual camera information.

In S808, the image processing server 100 categorizes the model data of multiple objects in the specified scene into model streaming distribution target model data and image streaming distribution target model data, based on the virtual camera information and the maximum object model data number Mn. Specifically, the image processing server 100 selects pieces of model streaming distribution target model data and pieces of image streaming distribution target model data among all pieces of model data. The types of objects include player and ball and an example of a method of categorizing the model data by using the types is described by using FIGS. 7A and 7B.

FIG. 7A is a diagram illustrating the positions of players, a ball, and a virtual camera 701 in a specific frame. Since the positions of objects such as the players and the ball are held in the metadata generated in advance in S309, a distance Lc between the virtual camera 701 and each object and a distance Lb between the ball and each object can be calculated.

FIG. 7B illustrates a model selection table in which the calculated distances of each object to the virtual camera and to the ball are stored. Object IDs in the left column are IDs for identifying the objects and codes such as "player N" and "ball" are assigned to the respective objects. The center column includes the distance Lc between the virtual camera 701 and each object and the right column includes the distance Lb between the ball and each object.

As a categorizing method based on the characteristics of the objects, assume a case where only some of the objects close to the virtual camera 701 are set as the target of model streaming based on the assumption that "objects close to the virtual camera 701 appear large to the virtual camera." In this case, the image quality degradation of the objects close to the virtual camera 701, that is objects displayed in large sizes is suppressed. Since the maximum object model data number Mn which is the maximum number of objects whose model data can be transmitted to each user terminal is already calculated, Mn objects are selected in the ascending order of the value of the distance Lc to the virtual camera 701 and are set as the target of model streaming.

As another categorizing method, there is a case where only the objects close to the ball are set as the target of model streaming based on the assumption that "objects close to a ball which is a major object tend to be a point of interest of the user." In this case, the image quality degradation of the objects close to the ball is suppressed. Also in this case, since the maximum object model data number Mn is already calculated, Mn objects excluding the ball can be selected in the ascending order of the value of the distance Lb to the ball and set as the target of model streaming.

Moreover, a part of the background texture needs to be set as the target of model streaming. This setting is made to prevent loss caused by image quality degradation in a pattern of a pitch. As illustrated in a texture transmission area 702 of FIG. 7A, a region to be the target of model streaming is a sector-shaped region within the angle of view of the virtual camera 701 and within a predetermined range of the virtual camera 701.

The categorization method is not limited to the methods described above. For example, it is possible to use a method in which the line of sight of the user is captured with a camera mounted on a front surface of the user terminal 110 and an area near an interest region (point of interest) of the user is set as the target of model streaming. The interest region of the user may be determined based on a touch operation or the like made by user on the user terminal 110. In the case where the interest region is used for the categorization, the configuration may be such that the user terminal 110 transmits interest information indicating the interest region of the user to the image processing server 100 and the image processing server 100 categorizes the objects based on the received interest information.

In S809, the image processing server 100 starts streaming distribution of the model data set as the target of model streaming to the user terminal 110.

In S810, in the case where the image streaming is necessary, the image processing server 100 executes CG rendering based on the model data of the background and the objects set as the targets of image streaming, in parallel with the model streaming in S809 by using another thread. The image processing server 100 sets the rendered image data as the CG rendering image data By and performs lossy encoding on the CG rendering image data By, and then generates the image streaming data. Note that, in the case where occlusion setting to be described later is performed, the image streaming data includes a distance map Bd generated by the image processing server 100 in S405.

In S811, the image processing server 100 starts streaming distribution of the generated image streaming data to the user terminal 110.

Meanwhile, in S826, the user terminal 110 receives the model streaming and obtains the model data.

In S827, the user terminal 110 executes CG rendering based on the obtained model data. The user terminal 110 sets the rendered image data as CG rendering image data Av and a distance map Ad.

In S828, in the case where the image streaming is performed, the user terminal 110 receives the image streaming data in parallel with S826 and S827 by using another thread to obtain the image streaming data and performs decoding processing of the obtained image streaming data.

In S829, the user terminal 110 obtains the image data By and the distance map Bd from the decoded image streaming data.

The start of the image streaming is delayed with respect to the start of the model streaming by time required to perform the rendering processing of the image data based on the model data and the encoding processing of the image data. Accordingly, the user terminal 110 waits to perform the rendering processing of S827 until the decoding processing of S828 is completed and the image data By and the distance map Bd are obtained in S829.

In S830, in the case where the user terminal 110 receives both of the model streaming data and the image streaming data, the user terminal 110 synthesizes the CG rendering image data Av and the CG rendering image data By and displays synthesized image data on the display-operation unit 115. FIG. 7C illustrates a schematic diagram explaining an outline of this synthesizing processing. The user terminal 110 generates the synthesized image data by laying one of the CG rendering image data Av and the CG rendering image data By over the other. In this case, occlusion is set for multiple objects aligned in the same direction as viewed from the virtual camera to make an object behind an object in the foreground invisible. To perform such setting, information indicating a front-rear relationship between the objects is necessary. Accordingly, in the case where an object in the CG rendering image data Av and an object in the CG rendering image data By overlap each other, the user terminal 110 sets the occlusion by arranging an object with the smaller value of distance in the distance map Ad and the distance map Bd in the foreground. Note that, in the case where the user terminal 110 receives only one of the model streaming data and the image streaming data, the user terminal 110 does not perform the synthesizing processing and displays the image data as it is on the display-operation unit 115.

Note that the synthesizing processing of S830 is not performed in the case where only the model streaming is performed and the image streaming is not performed.

In S831, in the case where the user terminal 110 receives an user operation relating to the virtual camera position or direction, the user terminal 110 updates the virtual camera information and returns to S825. In the case where there is no user operation relating to the virtual camera position or direction, the processing proceeds to step S832 after the end of the distribution of the contents.

In S832, the user terminal 110 determines whether the user has performed an operation of terminating the application after the end of contents. In the case where the user does not perform the operation of terminating the application, the processing returns to S824 and the user terminal 110 displays the scene selection 601 screen on the display-operation unit 115 and waits until the user makes selection. In the case where the user performs the operation of terminating the application, the user terminal 110 terminates the application.

In S812, in the case where the distribution of the contents ends, the image processing server 100 decrements the number Tn of terminals distribution to which is determined by one as Tn=Tn−1 and updates the current number Tn of terminals distribution to which is determined.

In S813, in the case where the image processing server 100 does not receive an operation of terminating the streaming distribution, the processing returns to S804. In the case where the image processing server 100 receives the operation of terminating the streaming distribution, the processing of the image processing server is terminated.

As described above, using both of the model streaming and the image streaming in a ratio depending on the status of the bandwidth of the line and the like allows streaming of the virtual viewpoint image data to be performed with small image quality degradation while preventing the transmission data size from exceeding the bandwidth. Note that the method of determining the ratio between the model streaming and the image streaming is not limited to the aforementioned example. For example, the ratio may be determined based on the type of the line (Wi-Fi or 4G, wired or wireless, or the like) or determined based on an input made by a user operation. Alternatively, a predetermined ratio may be used.

Embodiment 2

In this embodiment, description is given of a method of suppressing the latency on the image streaming side that occurs in the case where both of the model streaming and the image streaming are used. Note that description of the system (image processing server) and part of the processing that overlap those in Embodiment 1 is omitted.

Figure 9:
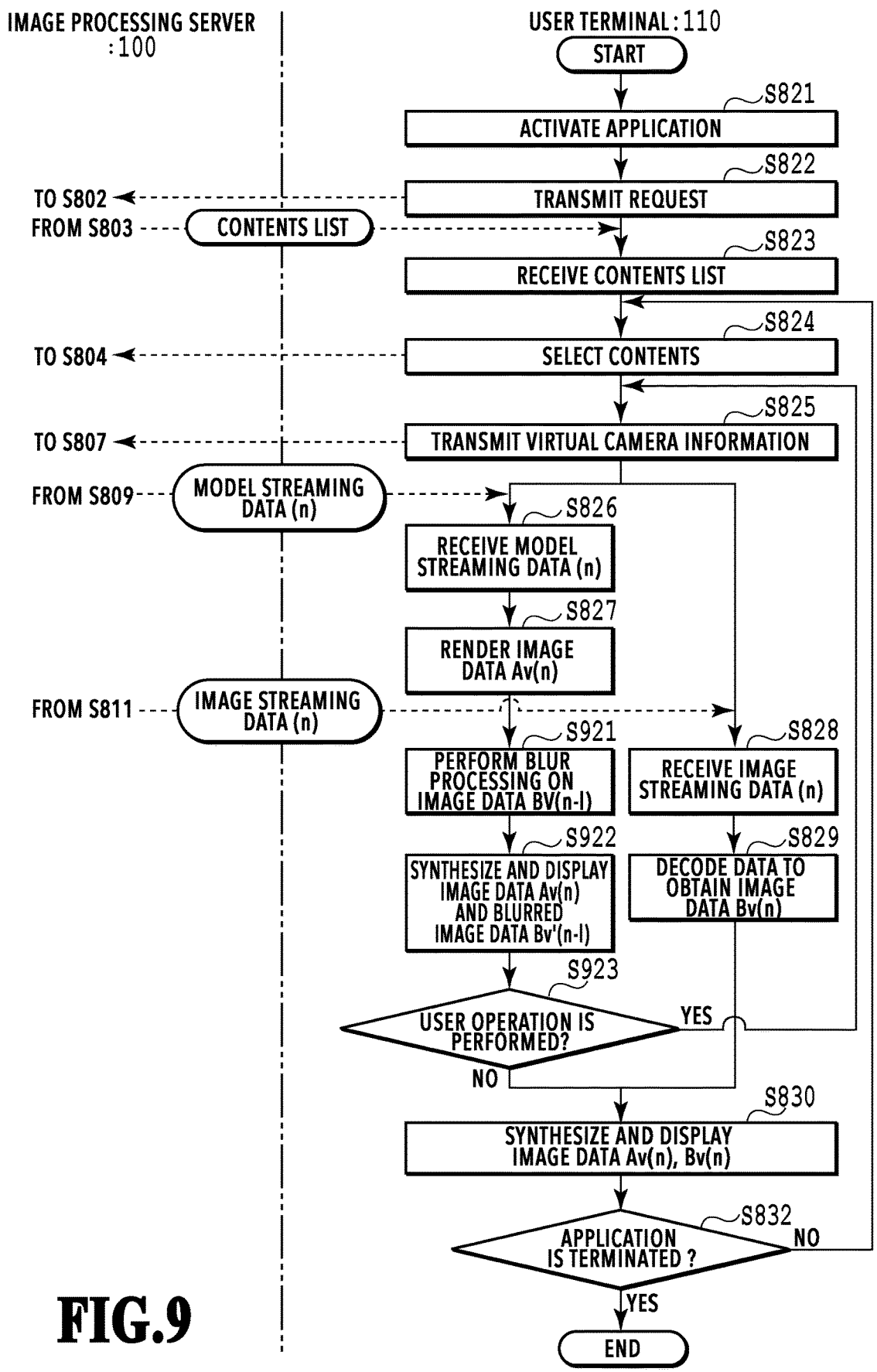
FIG. 9 is a flowchart illustrating model data distribution processing that suppresses latency.

FIG. 9 is a flowchart explaining processing steps of a virtual viewpoint image streaming method for suppressing the latency on the image streaming side. Note that, since the processing (S801 to S813) of the image processing server 100 and the processing (S821 to S824) of the user terminal 110 are the same as those in FIG. 8, the description thereof is omitted. The n-th frame is assumed to be set as the processing target in this description.

In S825, the user terminal 110 transmits the virtual camera information to the image processing server 100.

Thereafter the processing branches and S826 and S828 are executed in parallel in separate threads.

In S826, the user terminal 110 receives the model data distributed in the model streaming.

In S827, the user terminal 110 executes the CG rendering based on the received model data. The n-th frame of the image data rendered in the user terminal 110 is set as the CG rendering image data Av(n) and the distance map of the n-th frame is set as the distance map Ad(n).

Figure 10:
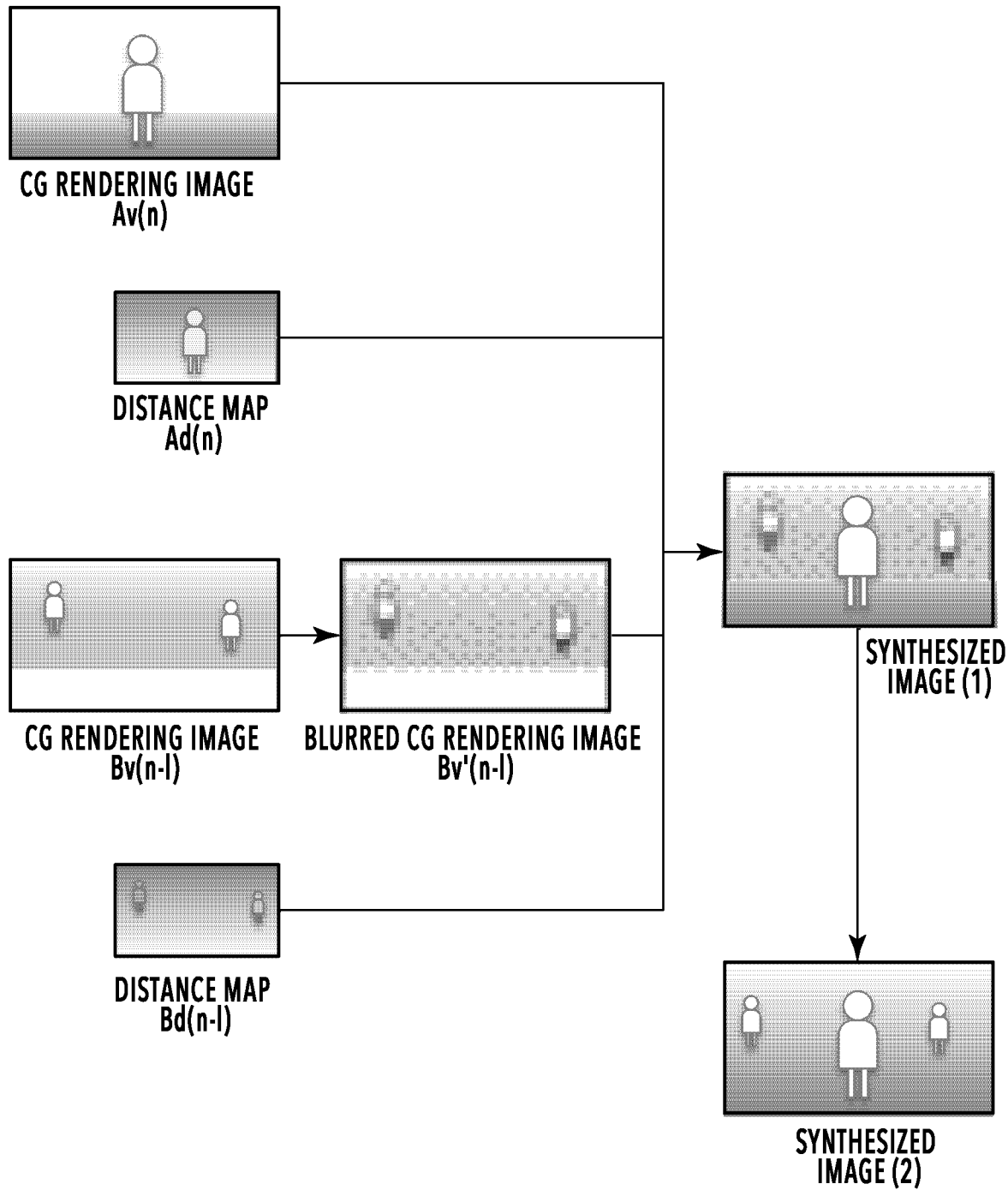
FIG. 10 is a view illustrating an outline of the model data distribution that suppresses latency.

In S921, the user terminal 110 loads, on the memory, the CG rendering image data Bv(n−1) and the distance map Bd(n−1) of a frame 1 frames before the n-th frame that is closest to the n-th frame in the image data By currently cashed (held) in the user terminal 110. The user terminal 110 executes blurring processing on the CG rendering image data Bv(n−1) to generate blurred image data BV'(n−1). A Gaussian filter or the like is used for the blurring processing. FIG. 10 illustrates a schematic diagram of the rendered blurred image data Bv'(n−1) and the distance map Bd(n−1) which are examples of the result of the aforementioned processing. Note that 1 is generally about 0<1<5.

In S922, the user terminal 110 synthesizes the CG rendering image data Av(n) and the rendered blurred image data and displays the synthesized image on the display-operation unit. A schematic view of an example of this synthesis result is illustrated as a synthesized image (1) in FIG. 10. As described above, for the CG rendering image data By for which a latency occurs, the latency can be suppressed by using data of a frame several frames before the latest frame. Moreover, in the case where the user is performing an operation, the user is less likely to notice the degradation in the image quality caused by the blurring processing performed on the CG rendering image data Bv(n−1).

In S923, in the case where the user terminal 110 receives an user operation relating to the virtual camera position or direction, the processing returns to S825 and is continuously executed. In the case where the user terminal 110 does not receive the user operation, the processing proceeds to S830.

In S828 executed in parallel with S826 to S923, the user terminal 110 receives the image streaming data of the n-th frame.

In S829, the user terminal 110 decodes the received image streaming data and obtains the CG rendering image data Bv(n).

In S830, the user terminal 110 synthesizes the CG rendering image data Av(n) and the CG rendering image data Bv(n) obtained in S929 and displays the synthesized image on the display-operation portion. An example of this synthesis result is illustrated as a synthesized image (2) in FIG. 10. The user terminal 110 thereby corrects an image quality degradation region subjected to the blurring processing in the CG rendering image data By, at a timing at which a specific period elapses from the user operation and the operation settles.

In S832, the user terminal 110 determines whether the user has performed an operation of terminating the application after the end of contents. In the case where the user does not perform the operation of terminating the application, the processing returns to S824 and the user terminal 110 displays the scene selection 601 screen on the display-operation unit 115 and waits until the user makes selection. In the case where the user performs the operation of terminating the application, the user terminal 110 terminates the application.

As described above, displaying a temporary synthesized image by blurring the image data By distributed in the already-held image streaming can suppress the latency and enables streaming of the virtual viewpoint image data in which the image quality degradation is less noticeable.

Embodiment 3

In this embodiment, description is given of a method of improving a transmission efficiency by selectively using lossless encoding. Note that description of a system and processing that overlap those in Embodiments 1 and 2 are omitted.

Figures 11A, 11B:
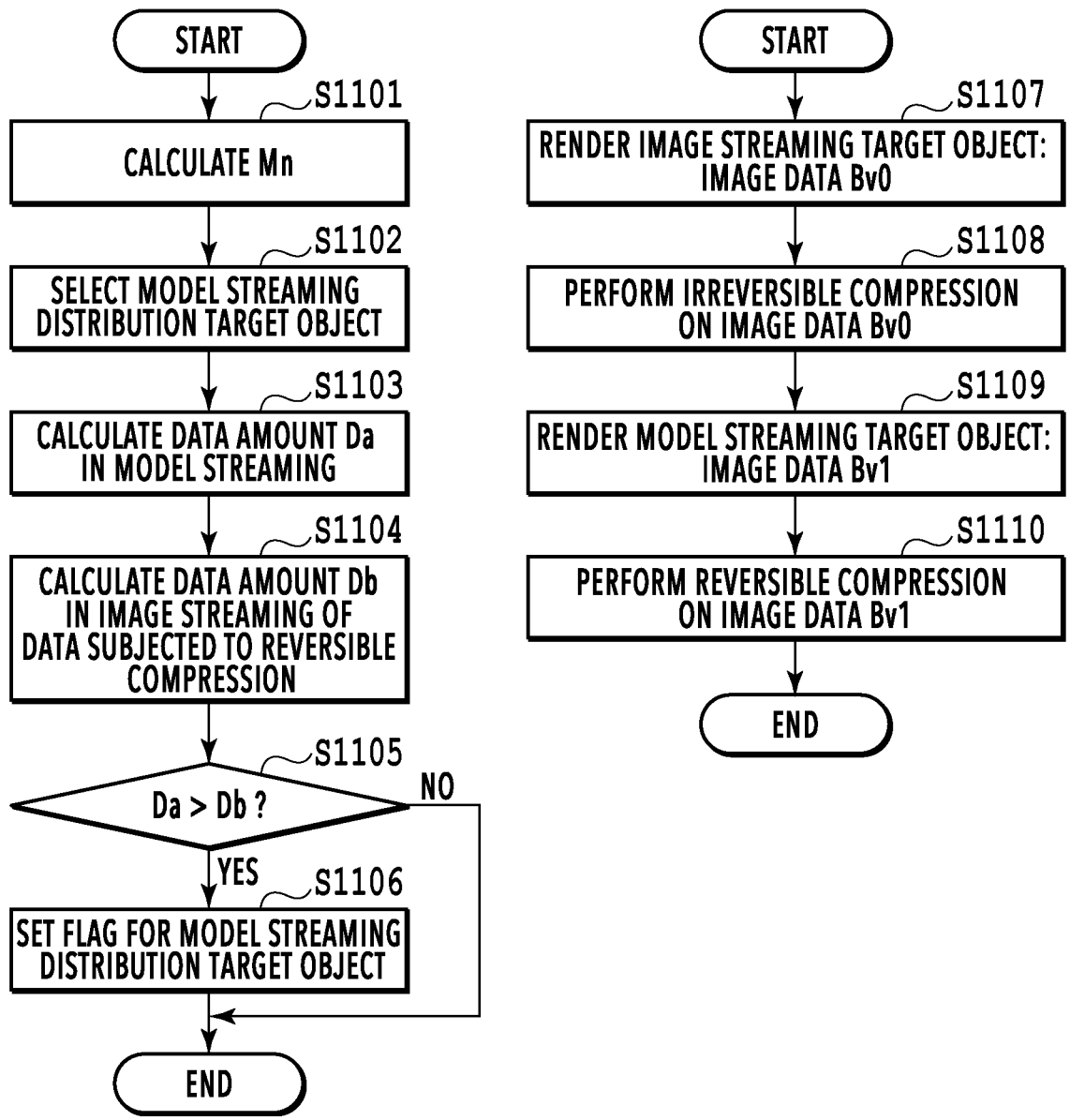
FIG. 11A is a flowchart illustrating processing for more efficient streaming.
FIG. 11B is a flowchart illustrating processing for more efficient streaming.

FIGS. 11A and 11B are flowcharts explaining other methods of S806 and S810 in FIG. 8. S1101 to S1106 replace the processing of S806 and S1107 to S1110 replace the processing of S810.

In S1101, the image processing server 100 calculates the maximum object model data number Mn which is the maximum number of objects whose model data can be transmitted to each user terminal per unit time.

In S1102, the image processing server 100 selects a model streaming distribution target object.

In S1103, the image processing server 100 calculates a data amount Da in the case where the model streaming is performed, from the maximum object model data number Mn.

In S1104, the image processing server 100 calculates a data amount Db in the case where CG rendering is performed for a model streaming target distribution target object and the image streaming is performed. In the calculation of the data amount Db, the frame information processed just before the calculation is used because the virtual camera information does not change greatly. Moreover, the data amount Db calculated in this case is assumed to be a data amount of image data obtained by CG rendering and subjected to lossless encoding.

In S1105, the image processing server 100 compares the sizes of the data amounts Da and Db. In the case where the data amount Db is smaller than the data amount Da, the processing proceeds to S1106. In the case where the data amount Db is greater than the data amount Da, the processing is terminated. Since the data amount Db is proportional to the resolution of the image to be displayed in the user terminal 110, the data amount Db is likely to be great in the case where the resolution is high. Meanwhile, the data amount Db is likely to be small in the case where the resolution is low.

In S1106, the image processing server 100 sets a flag used to identify the model streaming distribution target object for which CG rendering is to be performed in the image processing server 100.

In S1107, the image processing server 100 performs CG rendering on an image streaming distribution target object to obtain CG rendering image data Bv0.

In S1108, the image processing server 100 performs lossy encoding on the CG rendering image data Bv0, the lossy encoding achieving high compression efficiency but involving image quality degradation.

In S1109, the image processing server 100 renders the object for which the flag is set in S1106 to obtain CG rendering image data Bv1.

In S1110, the image processing server 100 performs lossless encoding on the CG rendering image data Bv1, the lossless encoding achieving low compression efficiency but involving no image quality degradation. In the distribution to the user terminal 110, distributing the CG rendering image data Bv0 and the CG rendering image data Bv1 can reduce the distributed data amount from that in the distribution in the model streaming.

As described above, the image processing server 100 in the embodiment uses the image streaming of the image data subjected to lossless encoding, in addition to the model streaming and the image streaming of the image data subjected to lossy encoding. Specifically, the image processing server 100 distributes the image data Bv0 subjected to lossy encoding for an object whose level of image quality is not important. Moreover, the image processing server 100 distributes the image data Bv1 subjected to lossless encoding for an object whose level of image quality is important in the case where the data amount in the image streaming using the lossless encoding can be made smaller than that in the model streaming. Meanwhile, the image processing server 100 performs model steaming for the object whose level of image quality is important in the case where the data amount in the model streaming can be made smaller than that in the image streaming using the lossless encoding. The streaming distribution of the virtual viewpoint image data can be thereby performed in high transmission efficiency.

Other Embodiments

In Embodiments 1 to 3, all user terminals 110 are equally processed. However, there is a method in which priority ranks are given to the respective terminals. The configuration may be such that the model data streaming is preferentially assigned to a user paying a charge in the application of the user terminal 110 and the remaining bandwidth of the communication line is distributed to other users. Moreover, there are user terminals 110 that have low processing performance and cannot execute rendering. The image processing server 100 may perform distribution only in the image streaming for such user terminals 110.

Such configurations can be achieved by setting the maximum object model data number Mn individually for each user terminal 110 depending on the conditions of the user terminal 110.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The technique of the present disclosure enables efficient distribution of data for reproduction of a virtual viewpoint image.

This application claims the benefit of Japanese Patent Application No. 2019-093788 filed May 17, 2019, which is hereby incorporated by reference wherein in its entirety.

What is claimed is:

1. An image processing apparatus comprising:
an obtaining unit configured to obtain model data indicating a three-dimensional shape of an object in a space;
a receiving unit configured to receive viewpoint information from an external apparatus, the viewpoint information indicating a virtual viewpoint for a virtual viewpoint image to be generated by the external apparatus based on data transmitted from the image processing apparatus, the virtual viewpoint image depicting the space as viewed from the virtual viewpoint;
a generating unit configured to generate image data by rendering a first portion of the obtained model data, based on the received viewpoint information; and
a transmitting unit configured to transmit the generated image data and a second portion of the obtained model data different from the first portion to the external apparatus,
wherein the generated image data and the second portion of the obtained model data are transmitted in a ratio based, at least in part, on a bandwidth of a communication channel between the image processing apparatus and the external apparatus.

2. The image processing apparatus according to claim 1, wherein the first portion of the model data is data indicating a three-dimensional shape of at least one of a plurality of objects in the space.

3. The image processing apparatus according to claim 2, wherein the at least one object is selected based on a type of the object.

4. The image processing apparatus according to claim 2, wherein the at least one object is selected based on a distance between the virtual viewpoint and the object.

5. The image processing apparatus according to claim 2, wherein the at least one object is selected based on a distance between a specific object among the plurality of objects and each of the other objects.

6. The image processing apparatus according to claim 2, wherein
the receiving unit receives interest information indicating a point of interest of a user from the external apparatus, and
the at least one object is selected based on the interest information.

7. The image processing apparatus according to claim 2, wherein the at least one object is selected based on a bandwidth of a communication channel to which the image processing apparatus is connected, such that a size of data transmitted from the image processing apparatus does not exceed the bandwidth of the communication channel.

8. The image processing apparatus according to claim 1, wherein the obtaining unit generates the model data based on a plurality of captured images obtained by capturing images of the space from different directions with a plurality of image capturing apparatuses.

9. The image processing apparatus according to claim 1, wherein the model data is point cloud data, voxel data, or mesh data.

10. The image processing apparatus according to claim 1, wherein the virtual viewpoint image is generated by synthesizing the image data transmitted from the image processing apparatus and other image data generated by rendering the second portion of the model data based on the viewpoint information.

11. The image processing apparatus according to claim 10, wherein the transmitting unit further transmits distance information to the external apparatus, the distance information used for the synthesizing and indicating a distance between the virtual viewpoint and the object.

12. The image processing apparatus according to claim 1, wherein
the receiving unit receives scene information from the external apparatus, the scene information specifying a scene corresponding to the virtual viewpoint image to be generated, and
the obtaining unit obtains the model data indicating a three-dimensional shape of an object in the scene specified by the received scene information.

13. The image processing apparatus according to claim 1, wherein the image data transmitted from the image processing apparatus includes partial image data subjected to lossless compression and partial image data subjected to lossy compression.

14. A control method of an image processing apparatus, comprising:
obtaining model data indicating a three-dimensional shape of an object in a space;
receiving viewpoint information from an external apparatus, the viewpoint information indicating a virtual viewpoint for a virtual viewpoint image to be generated by the external apparatus based on data transmitted from the image processing apparatus, the virtual viewpoint image depicting the space as viewed from the virtual viewpoint;
generating image data by rendering a first portion of the obtained model data, based on the received viewpoint information; and
transmitting the generated image data and a second portion of the obtained model data different from the first portion to the external apparatus,
wherein the generated image data and the second portion of the obtained model data are transmitted in a ratio based, at least in part, on a bandwidth of a communication channel between the image processing apparatus and the external apparatus.

15. The control method according to claim 14, wherein the first portion of the model data is data indicating a three-dimensional shape of at least one of a plurality of objects in the space.

16. The control method according to claim 15, wherein the at least one object is selected based on a bandwidth of a communication channel to which the image processing apparatus is connected, such that a size of data transmitted from the image processing apparatus does not exceed the bandwidth of the communication channel.

17. A non-transitory computer-readable storage medium storing a program that causes an image processing apparatus to execute a control method comprising:
obtaining model data indicating a three-dimensional shape of an object in a space;
receiving viewpoint information from an external apparatus, the viewpoint information indicating a virtual viewpoint for a virtual viewpoint image to be generated by the external apparatus based on data transmitted from the image processing apparatus, the virtual viewpoint image depicting the space as viewed from the virtual viewpoint;
generating image data by rendering a first portion of the obtained model data, based on the received viewpoint information; and
transmitting the generated image data and a second portion of the obtained model data different from the first portion to the external apparatus,
wherein the generated image data and the second portion of the obtained model data are transmitted in a ratio based, at least in part, on a bandwidth of a communication channel between the image processing apparatus and the external apparatus.

* * * * *